UNITED STATES PATENT OFFICE.

ADOLF JOLLES, OF VIENNA, AUSTRIA-HUNGARY.

MANUFACTURE OF A SALUTARY DRINK FROM DAIRY RESIDUES.

1,073,135. Specification of Letters Patent. Patented Sept. 16, 1913.

No Drawing. Application filed April 19, 1913. Serial No. 762,286.

*To all whom it may concern:*

Be it known that I, ADOLF JOLLES, subject of the Emperor of Austria-Hungary, residing at Vienna, Austria-Hungary, have invented certain new and useful Improvements in the Manufacture of a Salutary Drink from Dairy Residues; and I do hereby declare the following to be a full, clear, and exact description of the invention, such as will enable others skilled in the art to which it appertains to make and use the same.

This invention relates to the manufacture of a durable, colorless, odorless, salutary drink from the residual products of the dairy.

The chief parent materials are the by-product poor in fat obtained in the manufacture of cheese,—namely whey—and the so-called buttermilk, that is the liquid remaining after the milk fat has been removed. These two residues are generally used only as cattle food or as a source of their various components, such as milk sugar. It is true that whey, owing to its content of organic acids, lactic acid and citric acid, which are useful in certain illnesses, such as gout, uric acid trouble and the like, serves as a curative drink; but its general application as a salutary beverage is hindered both by its yellowish appearance and also by the odor, similar to that of cheese, which adheres to it in more or less high degree, and, not least, by the fact that ordinary whey is not a durable product. The drink obtained by clarifying the whey in the known manner, for example by filtering, and adding carbonic acid—the so-called "Champagne milk"—is not sufficiently free from these disadvantages to be of any commercial use.

The process forming the subject matter of the present invention is for the purpose of converting dairy residues and more especially whey, into a salutary drink having the same composition as the whey itself, that is containing in addition to the organic acids, not unimportant qualities of soluble albuminoids which have nutritive value, milk sugar and a number of inorganic salts, but free from the aforesaid disadvantages. To attain this purpose the whey or other residue to be treated is sterilized, without heat, by adding an acid, and is decolorized and deodorized by treatment with charcoal; after filtration the product still contains the original essential constituents of the original material, but can be kept without suffering bacterial decomposition. In order to increase the dietetic and invigorating effect of the product obtained in this manner, common salt or any other suitable salt, medicament, or carbonic acid, may be added if desired.

The aforesaid process may be practically carried out as follows: To the whey to be treated there is added, without heating, a suitable proportion of pure hydrochloric acid, sulfuric acid or an organic acid, such as acetic acid, tartaric acid or citric acid, the object being to sterilize the whey. For this purpose an addition of one per cent. by volume of hydrochloric acid is sufficient. In order to remove the odor and color from the whey, it is then treated with charcoal, preferably with a mixture of wood charcoal and bone black, in the proportion of 500 grams of such a mixture to one hectaliter of whey, and is then filtered. To the clear filtrate carbonate of soda may be added if desired, the proportion so added being such that the liquid has still a feebly acid reaction. If carbonate of soda be added, the subsequent addition of common salt or carbonic acid may be omitted, since by the action of the hydrochloric acid or the like on the sodium carbonate added there is formed on the one hand sodium chlorid or the like and on the other hand carbonic acid. Obviously, the order in which these operations are performed may be varied without affecting the essence of the invention. For example, the odor and color might be removed from the whey before the sterilization. Or inorganic salts or medicaments may be added before filtration. On the other hand the impregnation with carbonic acid, if adopted, must always be the last operation in the manufacture of the salutary drink from the dairy residues.

Claims.

1. The process of manufacturing a durable salutary drink from whey or other milk residue, which comprises adding without heating an acid capable of sterilizing the same and treating the sterilized product with charcoal to remove the odor and color.

2. The process of manufacturing a durable salutary drink from whey or other milk residue, which comprises adding without heating an acid capable of sterilizing the same and treating the sterilized product with charcoal and bone black to remove the odor and color.

3. The process of manufacturing a durable salutary drink from whey or other milk residue, which comprises adding without heating an acid capable of sterilizing the same and treating the sterilized product with charcoal to remove the odor and color, and then filtering the deodorized product.

4. The process of manufacturing a durable salutary drink from whey or other milk residue, which comprises adding without heating an acid capable of sterilizing the same, treating the sterilized product with charcoal to remove the odor and color, filtering the deodorized product and adding carbonate of soda to the clear filtrate.

5. The process of manufacturing a durable salutary drink from whey, which consists in sterilizing the whey by adding thereto without heating pure hydrochloric acid, treating the sterilized whey with wood charcoal and bone black to remove the odor and color, filtering the treated product and adding to the clear filtrate carbonate of soda.

In testimony that I claim the foregoing as my invention, I have signed my name in presence of two subscribing witnesses.

ADOLF JOLLES.

Witnesses:
JOSEF RUBASCH,
AUGUST FUGGER.